United States Patent
Kim et al.

(10) Patent No.: US 8,587,643 B2
(45) Date of Patent: Nov. 19, 2013

(54) SYSTEM FOR DISPLAYING MULTIVIDEO

(75) Inventors: Eui Tae Kim, Paju-si (KR); Seung Ho Baek, Goyang-si (KR)

(73) Assignee: LG Display Co., Ltd., Seoul (KR)

(*) Notice: Subject to any disclaimer, the term of this patent is extended or adjusted under 35 U.S.C. 154(b) by 323 days.

(21) Appl. No.: 12/969,992

(22) Filed: Dec. 16, 2010

(65) Prior Publication Data

US 2011/0157334 A1   Jun. 30, 2011

(30) Foreign Application Priority Data

Dec. 31, 2009 (KR) .................. 10-2009-0135063

(51) Int. Cl.
*H04N 13/04* (2006.01)

(52) U.S. Cl.
USPC ............... 348/56; 348/52; 348/53; 348/51

(58) Field of Classification Search
USPC ................................. 348/56, 52, 53, 51
See application file for complete search history.

(56) References Cited

U.S. PATENT DOCUMENTS

| | | | | |
|---|---|---|---|---|
| 7,142,252 B2* | 11/2006 | Song | ............... | 348/565 |
| 7,532,253 B1* | 5/2009 | Greenberg | ............... | 348/565 |
| 8,207,983 B2* | 6/2012 | Taneja et al. | ............... | 345/592 |
| 2003/0103062 A1* | 6/2003 | Lee et al. | ............... | 345/629 |
| 2009/0207238 A1* | 8/2009 | Kim et al. | ............... | 348/51 |
| 2011/0018983 A1* | 1/2011 | Kim et al. | ............... | 348/56 |
| 2011/0134231 A1* | 6/2011 | Hulvey et al. | ............... | 348/56 |
| 2011/0149053 A1* | 6/2011 | Ito et al. | ............... | 348/56 |

FOREIGN PATENT DOCUMENTS

| | | |
|---|---|---|
| CN | 1281316 A | 1/2001 |
| CN | 1414795 A | 4/2003 |

* cited by examiner

*Primary Examiner* — Shawn An
(74) *Attorney, Agent, or Firm* — Birch, Stewart, Kolasch & Birch, LLP (57) ABSTRACT

A system is discussed for displaying multivideo, which enables users to view a plurality of different video images at the same time through one video displaying system without lowering resolution. The system includes according to an embodiment a video processor for alternately outputting first and second images every predetermined number of frames according to a similarity between previous and present frames of first or second video image; and a display panel for displaying the video image outputted from the video processor.

9 Claims, 5 Drawing Sheets

SYSTEM FOR DISPLAYING MULTIVIDEO

CROSS REFERENCE TO RELATED APPLICATIONS

This application claims the priority benefit of the Korean Patent Application No. 10-2009-0135063 filed on Dec. 31, 2009, which is hereby incorporated by reference as if fully set forth herein.

BACKGROUND

1. Field of the Invention

The present invention relates to a system for displaying video, and more particularly, to a system for displaying multivideo which is capable of displaying a plurality of video images at the same time.

2. Discussion of the Related Art

Recently, television or monitor adopting a system for displaying multivideo has been widely used, wherein the system for displaying multivideo enables to simultaneously display a plurality of different video images via one displaying apparatus.

Figure 1A:
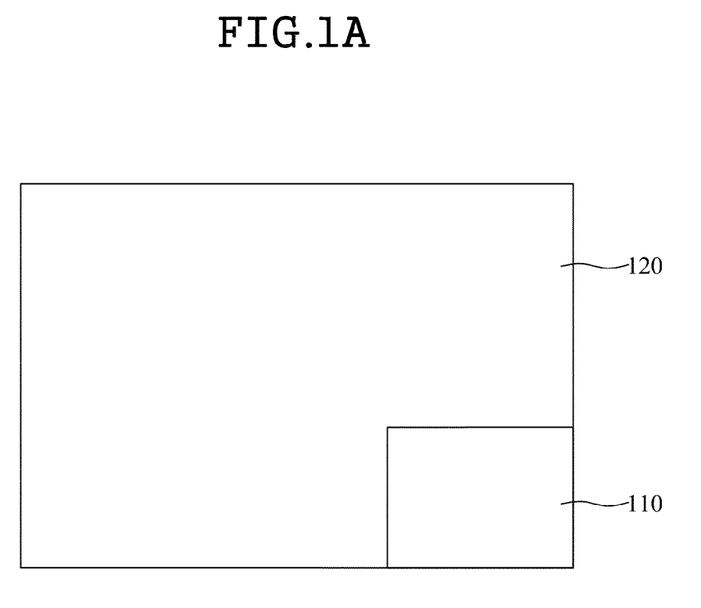
FIGS. 1A and 1B illustrate a related art screen of displaying a plurality of video images at the same time.
Figure 1B:
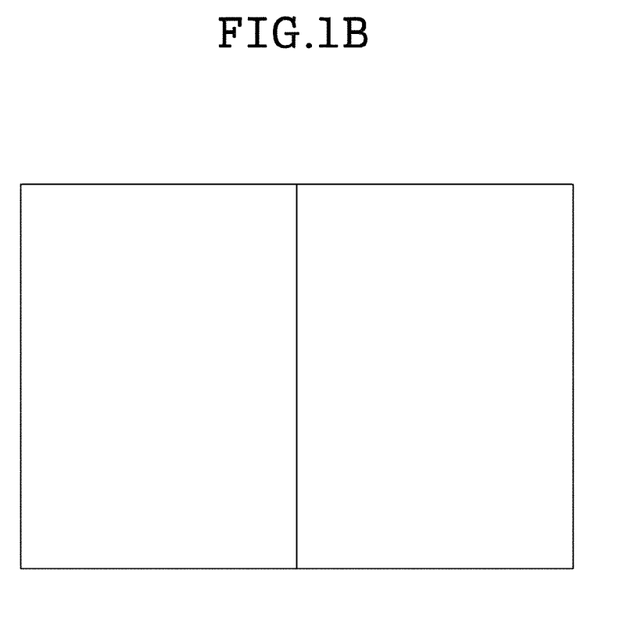

Generally, the system for displaying multivideo may utilize a PIP (Picture-In-Picture) method as shown in FIG. 1A, or a double picture method shown in FIG. 1B. In case of the PIP method, after a sub-screen 110 is inserted into a predetermined region of a main screen 120, the plurality of video images are simultaneously displayed in the main screen 120 and sub-screen 110. In case of the double picture method, after one screen is divided into left and right regions, or upper and lower regions, the plurality of video images are simultaneously displayed in the divided regions.

If utilizing the systems for displaying multivideo of FIGS. 1A and 1B, a full screen of each video image cannot be viewed. Furthermore, the plurality of video images comes into user's view, which might obstruct a user's view.

In case of the PIP method shown in FIG. 1A, a partial region of the main screen 120 may be covered and hidden by the sub-screen 110. In case of the double picture method shown in FIG. 1B, a horizontal size of the video image displayed on the screen is decreased in comparison to its original size, whereby the displayed video image is extended vertically, to thereby cause distortion in the displayed video image.

Accordingly, there is a need to develop the system for displaying multivideo, which can display the plurality of video images without degrading resolution.

SUMMARY

Accordingly, the present invention is directed to a system for displaying multivideo that substantially obviates one or more problems due to limitations and disadvantages of the related art.

An aspect of the present invention is to provide a system for displaying multivideo, which enables users to view a plurality of different video images at the same time through one video displaying system without degrading resolution.

Another aspect of the present invention is to provide a system for displaying multivideo, which facilitate to display a plurality of video images at the same time without image overlapping or image blurring.

Another aspect of the present invention is to provide a system for displaying multivideo, which is capable of displaying 3D images as well as 2D images according to a user' selection.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a system for displaying multivideo comprising: a video processor for alternately outputting first and second images every predetermined number of frames according to a similarity between previous and present frames of first or second video image; and a display panel for displaying the video image outputted from the video processor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a system for display multivideo according to the present invention will be described with reference to the accompanying drawings.

Figure 2:
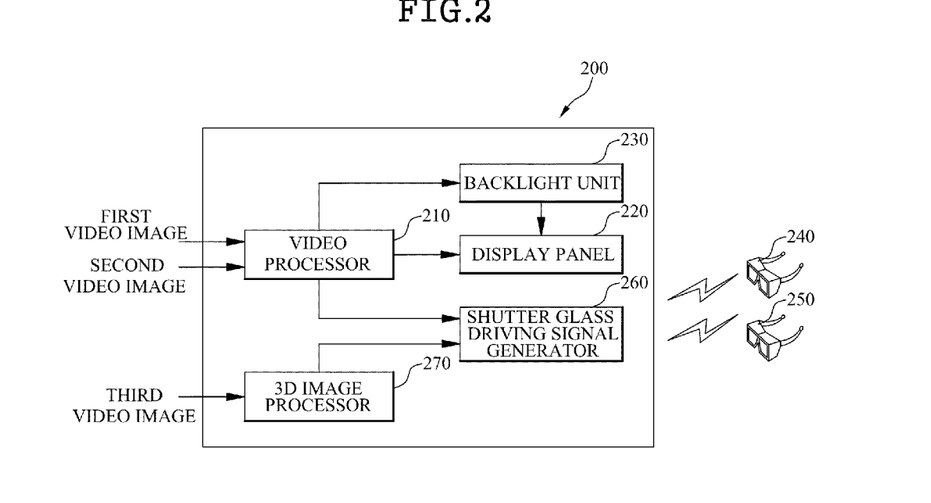
FIG. 2 is a block diagram illustrating a system for displaying multivideo according to one embodiment of the present invention.

FIG. 2 is a block diagram illustrating a system 200 for displaying multivideo according to one embodiment of the present invention. As shown in FIG. 2, the system 200 for displaying multivideo according to one embodiment of the present invention comprises a video processor 210, a display panel 220, and a backlight unit 230.

When the video processor 210 receives first and second video images which are different from each other, the video processor 210 alternately outputs the first and second video images to the display panel 220 every a predetermined number of frames according to a similarity between previous and present frames of the first or second video image.

The video processor 210 will be explained with reference to FIG. 3.

Figure 3:
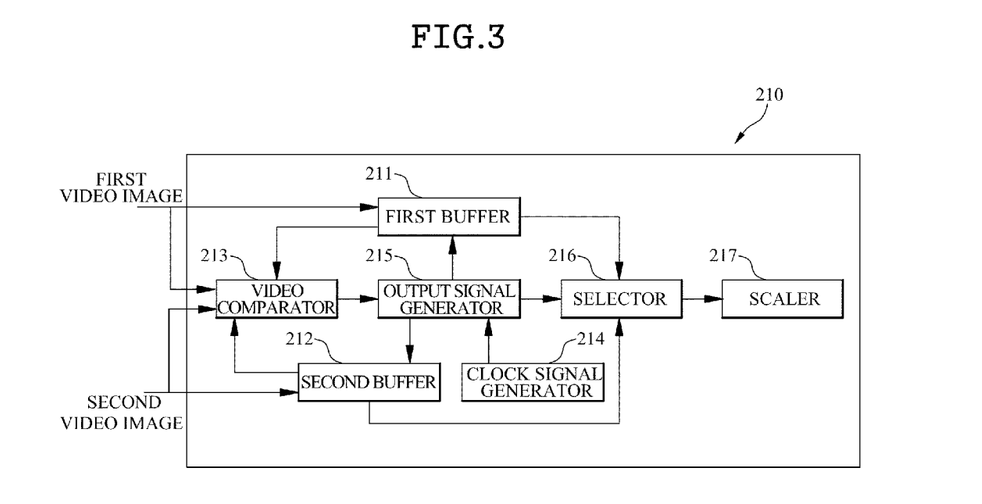
FIG. 3 is a block diagram illustrating a video processor of FIG. 2.

FIG. 3 illustrates the video processor 210 according to one embodiment of the present invention. As shown in FIG. 3, the video processor 210 according to one embodiment of the present invention includes a first buffer 211, a second buffer 212, a video comparator 213, a clock signal generator 214, and an output signal generator 215, and a selector 216.

First, when the first video image including RGB data, horizontal synchronous signal (Hsync), and vertical synchronous signal (Vsync) is received in the first buffer 211, the first buffer 211 stores the first video image by the unit of frame. According to a first buffer output signal provided from the output signal generator 215, the first buffer 211 provides the frame of the first video image to the selector 216.

When the second video image including RGB data, horizontal synchronous signal (Hsync), and vertical synchronous signal (Vsync) is received in the second buffer 212, the second buffer 212 stores the second video image by the unit of frame. According to a second buffer output signal provided from the output signal generator 215, the second buffer 212 provides the frame of the second video image to the selector 216.

Then, the video comparator 213 calculates the similarity between the present and previous frames in each of the first and second video images by comparing the present frame of the first video image with the previous frame of the first video image, or comparing the present frame of the second video image with the previous frame of the second video image; and provides the calculated similarity to the output signal generator 215.

According to one embodiment of the present invention, the video comparator 213 may calculate the similarity between the present and previous frames in each of the first and second video images by comparing a pixel value of the present frame with a pixel value of the previous frame.

For example, the video comparator 213 may determine the similarity between the present frame and the previous frame by using an average value of difference between the pixel value of the present frame and the pixel value of the previous frame in the first video image, or an average value of difference between the pixel value of the present frame and the pixel value of the previous frame in the second video image.

The clock signal generator 214 generates a clock signal for outputting the first video image having a first frame rate and the second video image having a first frame rate at a second frame rate; and then provides the generated clock signal to the output signal generator 215.

According to one embodiment of the present invention, the second frame rate may be twice the first frame rate. For example, if each of the first and second video images has 120 Hz frame rate, the clock signal generator 214 generates the clock signal to output the first and second video images at 240 Hz frame rate.

The output signal generator 215 generates an output signal for alternately outputting the frames of the first and second video images every predetermined number of the frames through the use of similarity between the present and previous frames of the first or second video image calculated by the video comparator 213, and the clock signal generated by the clock signal generator 214.

According to one embodiment of the present invention, the output signal includes a first buffer output signal for outputting the frame of the first video image stored in the first buffer 211; a second buffer output signal for outputting the frame of the second video image stored in the second buffer 212; and a selector output signal for alternately outputting the frames of the first and second video image through the selector 216 every predetermined number of the frames.

Figure 4:
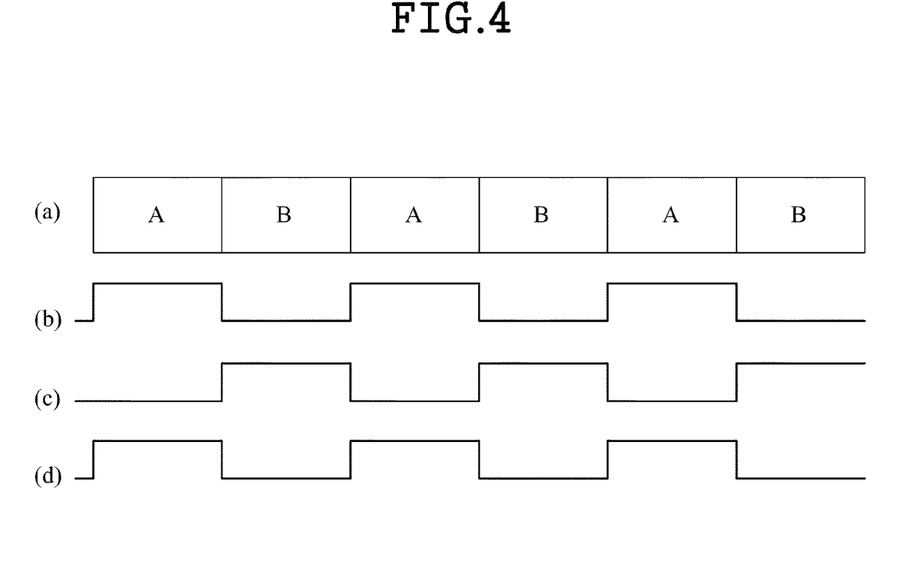
FIG. 4 illustrates waveforms of output signal to alternately output a plurality of video images every one frame.
Figure 5:
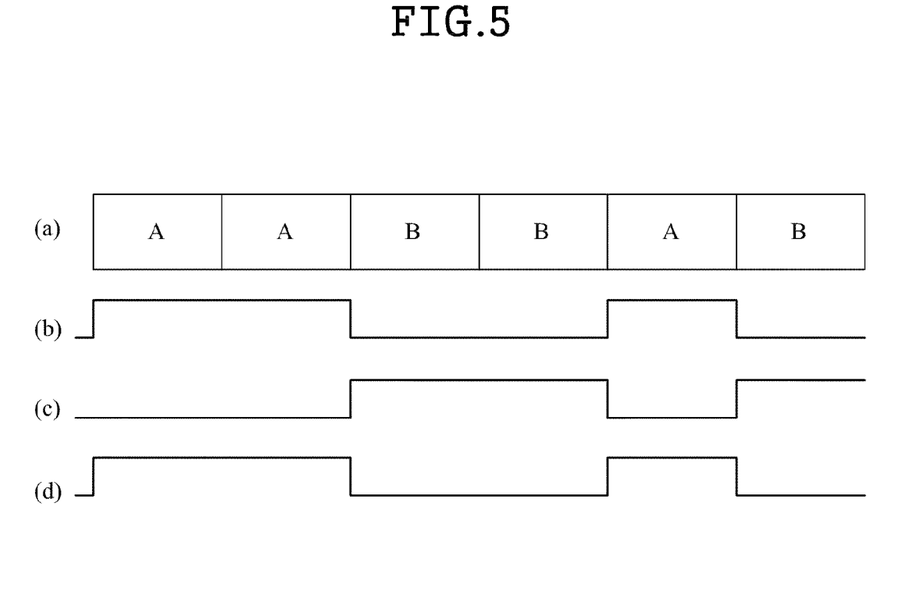
FIG. 5 illustrates waveforms of output signal to alternately output a plurality of video images every two or more frames.

Hereinafter, the output signals generated by the output signal generator 215 will be explained with reference to FIGS. 4 and 5. In FIGS. 4 and 5, the frame of the first video image is marked as 'A'; and the frame of the second video image is marked as 'B'.

In more detail, if the similarity between the present and previous frames of the first or second video image, which is calculated by the video comparator 213, is larger than a predetermined standard value, the output signal generator 215 generates and provides the first buffer output signal having a waveform shown in FIG. 4(b) to the first buffer 211; generates and provides the second buffer output signal having a waveform shown in FIG. 4(c) to the second buffer 212; and generates and provides the selector output signal having a waveform shown in FIG. 4(d) to the selector 216 with respect to the clock signal generated by the clock signal generator 214, so that the first and second video images are alternately outputted every one frame, as shown in FIG. 4(a).

In FIG. 4(d), 'High' indicates the frame output period of the first video image; and 'Low' indicates the frame output period of the second video image. It is known that these output signals enable to alternately output the first and second video images every one frame.

Meanwhile, if the similarity between the present and previous frames of the first or second video image, which is calculated by the video comparator 213, is smaller than the predetermined standard value, the output signal generator 215 generates and provides the first buffer output signal having a waveform shown in FIG. 5(b) to the first buffer 211; generates and provides the second buffer output signal having a waveform shown in FIG. 5(c) to the second buffer 212; and generates and provides the selector output signal having a waveform shown in FIG. 5(d) to the selector 216 with respect to the clock signal generated by the clock signal generator 214, so that the first and second video images are alternately outputted every two or more frames (for example, every two frames), as shown in FIG. 5(a).

In FIG. 5(d), 'High' indicates the frame output period of the first video image; and 'Low' indicates the frame output period of the second video image. It is known that these output signals enable to alternately output the first and second video images every two frames.

The number of frames of the video image to be outputted in sequence is changed based on the similarity between the present and previous frames. This is to prevent image blurring which might occur due to a slow response speed of liquid crystal.

That is, if the frames of the respective video images are alternately outputted every one frame under the large difference between the frames of the video images (that is, if the similarity is smaller than the predetermined standard value), image blurring may occur in the frames of the different video images. In this respect, if there is the large difference between the frames of the video images, the frame of the same video image is outputted in sequence.

The output signal generator 215 may additionally generate a backlight unit control signal to control the backlight unit 230.

In more detail, the output signal generator 215 generates the backlight unit control signal for driving the backlight unit 230 in a flash method so as to selectively emit light from the backlight unit 230 for the time period of outputting one frame; and then provides the generated backlight unit control signal to the backlight unit 230.

Figure 6:
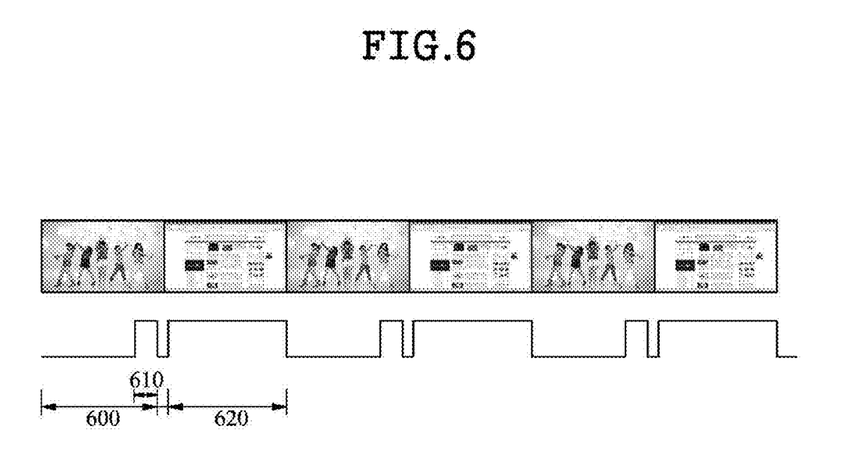
FIG. 6 illustrates a light-emitting timing of a backlight unit.

For example, as shown in FIG. 6, the output signal generator 215 can generate the backlight unit control signal which enables to emit the light only for a time period 610 after the latter half of the time period 600 of outputting one frame by the backlight unit 230.

According to one embodiment of the present invention, when the first or second video image is moving image, the output signal generator 215 may generate the backlight unit control signal to selectively emit the light only for some of the time period of outputting one frame.

For example, as shown in FIG. 6, if the first video image is moving image, and the second video image is still image, the output signal generator 215 generates the backlight unit control signal of the backlight unit 230 to selectively emit the light only for the predetermined period 610 in the time period 600 of outputting one frame, and also generates the backlight unit control signal of the backlight unit 230 to emit the light for the entire period in the time period 620 of outputting the second video image.

According to the selector output signal provided by the output signal generator 215, the selector 216 alternately outputs the frame of the first video image stored in the first buffer 211 or the frame of the second video image stored in the second buffer 212 as the second frame rate.

That is, the selector 216 outputs the frame of the first video image provided from the first buffer 211 when the selector output signal is 'High'; and outputs the frame of the second video image provided from the second buffer 212 when the selector output signal is 'Low'.

The video processor 210 may further comprise a scaler 217 as shown in FIG. 3.

The scaler 217 adjusts a scale of the frame of the first or second video image outputted from the selector 216, to thereby scale up or down a resolution of the first or second video image.

If the first and second video images are analog images, the video processor 210 may further comprise an analog-digital converter (not shown) which converts the analog images to digital images, and provides the digital images to the first and second buffers 211 and 212.

Referring once again to FIG. 2, the display panel 220 displays the image outputted from the video processor 210. According to one embodiment of the present invention, the display panel 220 may be a liquid crystal display panel.

If the display panel 220 corresponds to the liquid crystal display panel, the display panel 220 comprises first and second substrates (not shown) facing each other, and the liquid crystal layer (not shown) between the first and second substrates. Herein, the first and second video images are displayed by adjusting light transmittance of the liquid crystal layer.

The first and second video images provided from the video processor 210 to the display panel 220 include RGB data, horizontal synchronous signal (Hsync), vertical synchronous signal (Vsync), and data enable signal (DE).

The backlight unit 230 emits the light to the display panel 220 according to the backlight unit control signal provided from the video processor 210, whereby the first and second video images are displayed on the display panel 220.

That is, the backlight unit 230 enables to selectively emit the light in the time period of outputting one frame according to the backlight unit control signal.

Thus, the selective driving of the backlight unit 230 overcomes the problem of image blurring, and simultaneously reduces the power consumption.

The system for displaying multivideo according to the present invention may further comprise a first shutter glass 240 for viewing the first video image; a second shutter glass 250 for viewing the second video image; and a shutter glass driving signal generator 260 for generating a first shutter glass driving signal to drive the first shutter glass 240, and a second shutter glass driving signal to drive the second shutter glass 250, as shown in FIG. 2.

The first shutter glass 240 may be opened or shuttered according to the first shutter glass driving signal provided from the shutter glass driving signal generator 260, to thereby output the first video image.

Figure 7:
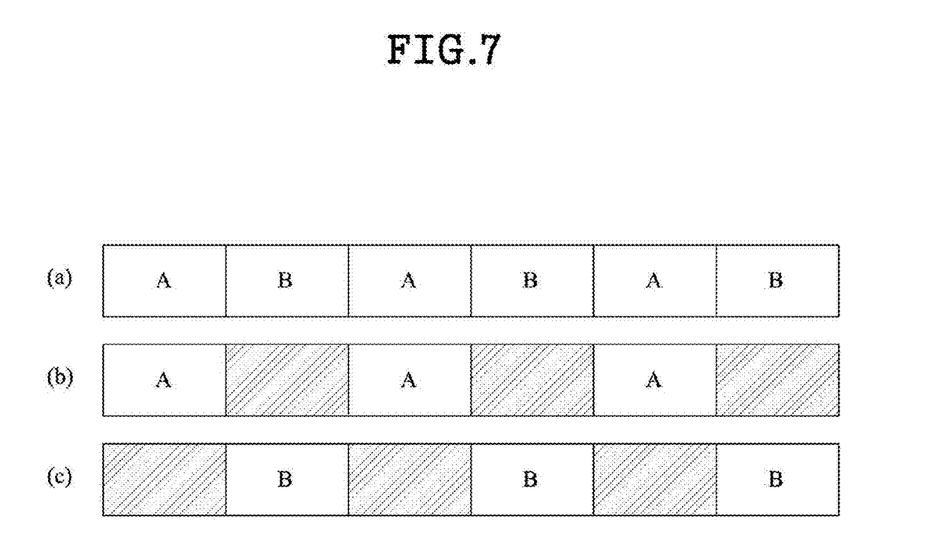
FIG. 7 illustrates an image output according to opening or shuttering of a shutter glass.

In more detail, as shown in FIG. 7(a), supposing that the first and second video images are alternately outputted every one frame. In this case, the first shutter glass 240 is opened at the time point when the frame of the first video image is outputted, and is shuttered at the time point when the frame of the second video image is outputted, as shown in FIG. 7(b), whereby a viewer can view the first video image.

The second shutter glass 250 may be opened or shuttered according to the second shutter glass driving signal provided from the shutter glass driving signal generator 260, to thereby output the second video image.

In more detail, the second shutter glass 250 is opened at the time point when the frame of the second video image is outputted, and is shuttered at the time point when the frame of the first video image is outputted, as shown in FIG. 7(c), whereby a viewer can view the second video image.

The shutter glass driving signal generator 260 generates a first shutter glass driving signal, which opens the first shutter glass 240 at the time point when the frame of the first video image is outputted, and shutters the first shutter glass 240 at the time point when the frame of the second video image is outputted, according to the output signal provided from the output signal generator 215.

Also, the shutter glass driving signal generator 260 generates a second shutter glass driving signal, which opens the second shutter glass 250 at the time point when the frame of the second video image is outputted, and shutters the second shutter glass 250 at the time point when the frame of the first video image is outputted, according to the output signal provided from the output signal generator 215.

The shutter glass driving signal generator 260 may respectively transmit the first and second shutter glass driving signals to the first and second shutter glasses 240 and 250 by wire or wireless.

As shown in FIG. 2, the system 200 for displaying multivideo according to the present invention may further comprise a three-dimensional (3D) image processor 270 which receives 3D image, processes the received 3D image, and outputs the processed 3D images to the display panel 220.

When a third video image corresponding to the 3D image is received in the 3D image processor 270, the 3D image processor 270 obtains left-eye and right-eye images from the third image, and then alternately outputs the left-eye and right-eye images every frame unit (for example, every one frame) to the display panel 220.

Figure 8:
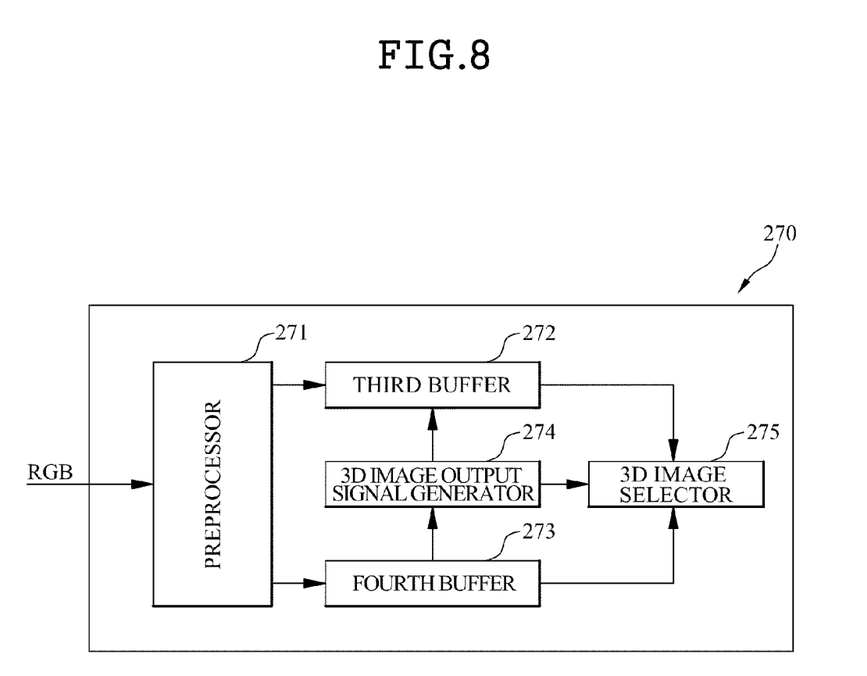
FIG. 8 is a block diagram illustrating a 3D image processor of FIG. 2.

For this, the 3D image processor 270 may comprise a preprocessor 271, a third buffer 272, a fourth buffer 273, a 3D image output signal generator 274, and a 3D image selector 275, as shown in FIG. 8.

The preprocessor 271 obtains the left-eye image and the right-eye image from the third image; the third buffer 272 stores the frame of the left-eye image obtained by the preprocessor 271; and the fourth buffer 273 stores the frame of the right-eye image obtained by the preprocessor 271.

The 3D image output signal generator 274 generates a 3D image output signal for alternately outputting the frame of the left-eye image and the frame of the right-eye image every one frame.

According to one embodiment of the present invention, the 3D image output signal may include a third buffer output signal for outputting the frame of the left-eye image stored in the third buffer 272, a fourth buffer output signal for outputting the frame of the right-eye image stored in the fourth buffer 273, and a 3D image selector output signal for alternately outputting the left-eye image and the right-eye image every one frame.

Thus, the 3D image output signal generator 274 provides the third buffer output signal to the third buffer 272, provides the fourth buffer output signal to the fourth buffer 273, and provides the 3D image selector output signal to the 3D image selector 275, whereby the left-eye image and the right-eye image are alternately outputted every one frame.

The 3D image selector 275 alternately outputs the frame of the left-eye image and the frame of the right-eye image respectively provided from the third and fourth buffers 272 and 273 every one frame according to the 3D image selector output signal provided by the 3D image output signal generator 274.

For example, if the 3D image selector output signal is high, the 3D image selector 275 outputs the frame of the left-eye image stored in the third buffer 272. Meanwhile, if the 3D image selector output signal is low, the 3D image selector 275 outputs the frame of the right-eye image stored in the fourth buffer 273.

Like the aforementioned video processor 210, the 3D image processor 270 may further comprise a scaler (not shown) which adjusts a resolution of the third image by scaling up or down the scale of the third image corresponding to the 3D image.

Also, the 3D image processor 270 may further comprise an analog-digital converter (not shown), on the assumption that the third image is the analog image, wherein the analog-digital converter converts the analog image to the digital image, and provides the digital image to the preprocessor 271.

The explanation for the aforementioned embodiment of the present invention shows that the 3D image processor 270 is separately provided from the video processor 210. In a modified embodiment of the present invention, the video processor 210 may perform the function of the 3D image processor 270.

In this case, the preprocessor 271 is additionally provided in the video processor 210; the frame of the left-eye image is stored in the first buffer 211; the frame of the right-eye image is stored in the second buffer 212; the 3D image output signal is generated by the output signal generator 215; and the frame of the left-eye image and the frame of the right-eye image are alternately outputted by the selector 216.

According to the embodiment of the present invention, the shutter glass driving signal generator 260 generates a shutter glass driving signal for selectively driving the first or second shutter glass 240 or 250 so as to view the third image.

For convenience of explanation, supposing that the first shutter glass 240 is the shutter glass for viewing the third image. There is an explanation about a method for generating the driving signal of the first shutter glass to view the 3D image by the shutter glass driving signal generator 260.

The shutter glass driving signal generator 260 generates a driving signal for a left-eye side of the first shutter glass 240, wherein the driving signal enables to open the left-eye side of the first shutter glass 240 at the time point when the frame of the left-eye image is outputted, and to shutter the left-eye side of the first shutter glass 240 at the time point when the frame of the right-eye image is outputted.

Also, the shutter glass driving signal generator 260 generates a driving signal for a right-eye side of the first shutter glass 240, wherein the driving signal enables to open the right-eye side of the first shutter glass 240 at the time point when the frame of the right-eye image is outputted, and to shutter the right-eye side of the first shutter glass 240 at the time point when the frame of the left-eye side image is outputted.

The system 200 for displaying multivideo according to the present invention further comprises a mode selector (not shown) into which an image display mode is inputted. Thus, it is possible to display the image according to the image display mode selected by a user.

The image display mode may include a first mode to display one two-dimensional image (2D image), a second mode to display plural two-dimensional images at the same time, and a third mode to display one three-dimensional image (3D image).

If the second mode or third mode is selected by the user, it is performed by the video processor 210 or 3D image processor 270. If the first mode is selected by the user, the video processor 210 or 3D image processor 270 bypasses the received image, and outputs the bypassed image to the display panel 220.

Accordingly, the plurality of video images are alternately outputted by the unit of frame so that the user can simultaneously view the plurality of different video images without lowering the resolution.

Based on the similarity between the frames of each video image, the frames of the video image are alternately outputted so that the plurality of video images are simultaneously displayed without the image blurring.

If displaying the moving image, the backlight unit 230 emits the light only for the predetermined period in the frame displaying period of the video image, to thereby minimize the image blurring.

According to the user's selection, the 3D image is displayed as well as the 2D image, which enables to satisfy the user's various needs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A system for displaying multi video comprising:
    a video processor for alternately outputting first and second images every predetermined number of frames according to a similarity between previous and present frames of first or second video image; and
    a display panel for displaying the video image outputted from the video processor,
    wherein the video processor alternately outputs the first and second video images every two or more frames when the similarity is smaller than a predetermined standard value, and alternately outputs the first and second video images every one frame when the similarity is larger than the predetermined standard value.

2. The system according to claim 1, wherein the video processor comprises:
    a first buffer for storing the frames of the first video image therein;

a second buffer for storing the frames of the second video image therein;

a video comparator for calculating the similarity between the previous and present frames of the first or second video image by comparing the previous frame of the first or second video image with the present frame of the first or second video frame;

a clock signal generator for generating a clock signal to output the first and second video images having a first frame rate at a second frame rate;

a selector for alternately outputting the frame of the first video image and the frame of the second video image; and an output signal generator for generating an output signal to alternately output the first video image and the second video image every predetermined number of the frames with reference to the similarity and clock signal.

3. The system according to claim 2, wherein the output signal generated by the output signal generator comprises:

a first buffer output signal for outputting the frame of the first video image stored in the first buffer;

a second buffer output signal for outputting the frame of the second video image stored in the second buffer; and a selector output signal for alternately outputting the first video image and the second video image every predetermined number of the frames via the selector.

4. The system according to claim 1, further comprising:

a shutter glass driving signal generator for generating a first shutter glass driving signal to drive the first shutter glass, and a second shutter glass driving signal to drive the second shutter glass, wherein the first shutter glass driving signal opens the first shutter glass at the time point when the frame of the first video image is outputted, and shutters the first shutter glass at the time point when the frame of the second video image is outputted; and wherein the second shutter glass driving signal opens the second shutter glass at the time point when the frame of the second video image is outputted, and shutters the second shutter glass at the time point when the frame of the first video image is outputted.

5. The system according to claim 1, further comprising:

a 3D image processor for obtaining left-eye image and right-eye images from a third video image corresponding to a 3D image, and alternately outputs the left-eye image and right-eye images by the unit of frame.

6. The system according to claim 5, further comprising:

a shutter glass driving signal generator for generating a driving signal for left-eye side of the shutter glass, and a driving signal for right-eye side of the shutter glass, so as to view the third video image, wherein the driving signal for left-eye side of the shutter glass open the left-eye side of the shutter glass at the time point when the frame of the left-eye image is outputted, and shutters the left-eye side of the shutter glass at the time point when the frame of the right-eye image is outputted; and wherein the driving signal for right-eye side of the shutter glass opens the right-eye side of the shutter glass at the time point when the frame of the right-eye image is outputted, and shutters the right-eye side of the shutter glass at the time point when the frame of the left-eye side image is outputted.

7. The system according to claim 1, wherein the video processor further comprises a scaler for adjusting and outputting a scale of the first and second video images.

8. The system according to claim 1, further comprising:

a first shutter glass for viewing the first video image, wherein the first shutter glass is opened at the time point when the frame of the first video image is outputted, and is shuttered at the time point when the frame of the second video image is outputted; and a second shutter glass for viewing the second video image, wherein the second shutter glass is opened at the time point when the frame of the second video image is outputted, and is shuttered at the time point when the frame of the first video image is outputted.

9. The system according to claim 1, further comprising a backlight unit for emitting light to the display panel under the control of the video processor, wherein the video processor generates a backlight unit control signal for selectively driving the backlight unit within the period of outputting the frame of the first or second video image, and then provides the generated backlight unit control signal to the backlight unit.

* * * * *